(12) United States Patent
Liao et al.

(10) Patent No.: US 10,435,526 B2
(45) Date of Patent: Oct. 8, 2019

(54) TRANSPARENT POLYESTER FILM WITH LOW VISIBLE LIGHT TRANSMITTANCE AND HIGH INFRARED-BLOCKING RATE AND METHOD FOR MAKING THE SAME

(71) Applicant: NAN YA PLASTICS CORPORATION, Taipei (TW)

(72) Inventors: Te-Chao Liao, Taipei (TW); Chun-Che Tsao, Taipei (TW); Chia-Ho Cheng, Taipei (TW); Tzai-Shing Chen, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 232 days.

(21) Appl. No.: 15/634,037

(22) Filed: Jun. 27, 2017

(65) Prior Publication Data

US 2018/0002501 A1 Jan. 4, 2018

(30) Foreign Application Priority Data

Jul. 4, 2016 (TW) .............................. 105121074 A

(51) Int. Cl.
| | |
|---|---|
| *C08J 5/18* | (2006.01) |
| *C08K 3/013* | (2018.01) |
| *B29C 48/08* | (2019.01) |
| *B29C 48/00* | (2019.01) |
| *G02B 5/20* | (2006.01) |
| *C01D 17/00* | (2006.01) |
| *B29K 67/00* | (2006.01) |
| *B29K 105/16* | (2006.01) |

(52) U.S. Cl.
CPC ............ *C08J 5/18* (2013.01); *B29C 48/022* (2019.02); *B29C 48/08* (2019.02); *C08K 3/013* (2018.01); *G02B 5/208* (2013.01); *B29K 2067/00* (2013.01); *B29K 2067/003* (2013.01); *B29K 2105/162* (2013.01); *B29K 2995/0011* (2013.01); *B29K 2995/0025* (2013.01); *B29K 2995/0026* (2013.01); *B29K 2995/0027* (2013.01); *B29K 2995/0029* (2013.01); *C01D 17/003* (2013.01); *C08J 2367/02* (2013.01); *C08K 2201/005* (2013.01)

(58) Field of Classification Search
CPC ....... C08J 5/18; C08J 2367/02; B29C 48/022; B29C 48/08; C08K 3/013; C08K 2201/005; G02B 5/208; B29K 2995/0029; B29K 2067/003; B29K 2105/162; B29K 2995/0011; B29K 2995/0026; B29K 2995/0027; B29K 2995/0025; B29K 2067/00; C01D 17/003

See application file for complete search history.

(56) References Cited

U.S. PATENT DOCUMENTS

| | | | | |
|---|---|---|---|---|
| 6,849,434 | B2* | 2/2005 | Ingram | ................ C12N 9/0006 435/161 |
| 8,258,226 | B2* | 9/2012 | Fujita | ..................... B82Y 30/00 524/406 |
| 8,268,202 | B2* | 9/2012 | Mamak | ................ C01G 41/006 252/587 |
| 9,434,652 | B2* | 9/2016 | Chen | ..................... C04B 35/495 |
| 9,908,306 | B2* | 3/2018 | Hara | ...................... G02B 5/287 |
| 10,308,823 | B2* | 6/2019 | Okada | .................. C09D 11/037 |
| 2003/0096942 | A1* | 5/2003 | Jen | .......................... C08G 63/20 528/272 |
| 2005/0165148 | A1* | 7/2005 | Bogerd | .................. C08K 5/005 524/403 |
| 2008/0116426 | A1* | 5/2008 | Adachi | ............. B29C 66/73117 252/582 |
| 2011/0248255 | A1* | 10/2011 | Kim | ....................... H01L 27/283 257/40 |
| 2013/0200292 | A1* | 8/2013 | Fung | ...................... C09D 5/004 252/62 |
| 2014/0187701 | A1* | 7/2014 | Chung | ..................... C08K 3/22 524/406 |
| 2016/0082697 | A1* | 3/2016 | Hara | ...................... G02B 5/287 428/212 |
| 2017/0103826 | A1* | 4/2017 | Al-Harthi | ................ H01B 1/04 |

* cited by examiner

*Primary Examiner* — Jeffrey M Wollschlager
(74) *Attorney, Agent, or Firm* — Li & Cai Intellectual Property (USA) Office

(57) ABSTRACT

A transparent polyester film has low visible light transmittance of 5-50% by JIS K7705 testing standard and a high infrared-blocking rate of at least 90% by JIS R3106 testing standard, which is extruded from a kind of polyester resins obtained from 5-40 wt % of nanoparticle-based thermal insulation slurry and/or 0.005-0.1 wt % of nanoparticle-based black pigment slurry by weight of and to react with the polymerization materials to completely perform an esterification and a polycondensation, wherein the thermal insulation nanoparticle has a chemical formula of $Cs_xN_yWO_{3-z}Cl_C$ with an average particle size of 10-90 nm and the nanoparticle-based black contains carbon black particles having a particle size of 20-80 nm.

6 Claims, No Drawings

TRANSPARENT POLYESTER FILM WITH LOW VISIBLE LIGHT TRANSMITTANCE AND HIGH INFRARED-BLOCKING RATE AND METHOD FOR MAKING THE SAME

BACKGROUND OF THE INVENTION

1. Field of the Invention

The present invention relates to a transparent polyester film and a method for making the same. More particularly, the invention relates to a transparent heat-shielding polyester film with low visible light transmittance and high infrared-blocking rate, and to a method for making the same.

2. Description of Related Art

In order to save energy and reduce carbon dioxide emissions, it is a common practice nowadays to carry out thermal insulation with a layer of heat-shielding material adhered to the glass panels of building and automobiles. A notable example of heat-shielding materials is metal oxides, whose physical properties contribute to effective thermal insulation and which have been widely used to block infrared radiation.

Thermal insulation films for use on transparent windows generally include a metallic reflective coating or an organic-dye coating in order to provide thermal insulation. A metallic reflective coating insulates heat by reflecting both infrared and ultraviolet radiation and is therefore disadvantaged by an undesirably high reflectivity. An organic-dye coating, on the other hand, absorbs infrared radiation and hence insulates heat ineffectively. The color of an organic-dye coating also tends to fade over time.

Another thermal insulation films feature a multilayer film structure made by electroplating or sputtering a dielectric substrate with a thin layer of metal (e.g., silver). This multilayer film structure can be configured to cause interference that redistributes the intensity of light, thereby enhancing penetration of the visible spectrum and reflection of the infrared band to achieve thermal insulation. This type of thermal insulation films, however, requires considerable investment in equipment and expensive materials but only have a low product yield.

In regards to those known prior arts related to teach an infrared-blocking material, U.S. Pat. No. 5,385,751 discloses a fluorine-doped tungsten oxide as an infrared-blocking material. This material is made by chemical vapor deposition and is hence disadvantaged by a high manufacturing equipment cost and a high production cost.

Japanese Published Patent Application No. 2003-121884 discloses a method for making a tungsten trioxide powder, whose method includes the steps of: dissolving tungsten hexafluoride in alcohol, separating a precipitate from the solution, and heating the precipitate at 100-500° C. to produce the tungsten trioxide powder. The tungsten trioxide powder thus obtained is applicable as an infrared-blocking material.

US Published Patent Application No. 2006/0178254 discloses a method for preparing a tungsten oxide and a tungsten oxide composite, wherein the tungsten oxide and tungsten oxide composite obtained are optically effective in blocking infrared radiation. Nevertheless, the heat treatment required is so complicated that, during mass production, the optimal condition of each step of the heat treatment must be individually adjusted; consequently, difficulties in quality control result in unstable product quality.

Japanese Published Patent Application No. H10-67881A discloses a solution-dyed black polyester composition having an excellent dispersion of specific carbon blacks, but the carbon blacks after dispersed in the solution-dyed black polyester composition are apt to agglomerate to coarse particles, leading to the solution-dyed black polyester composition being difficulty in quality control.

Other applicable prior art discloses a method for making a black film by melting, extruding, and stretching a mixture of polyester resins, a black polyester masterbatch, and an organic carbon black dye. More specifically, the black film is made by, among other steps, adding a certain percentage of black polyester masterbatch in the film extrusion stage through a precision metering device. As the method is subject to the precision and stability of the metering device, a metering error often leads to a difference in color and premature color fading.

Conventionally, to manufacture a thermal insulation film features highly effective thermal insulation and low visible light transmittance at least involves providing a substrate with a thermal insulation layer to insulate heat, and further providing the substrate with a colored layer to reduce transmittance by blocking visible light. If a plastic substrate is used, however, the foregoing steps tend to cause significant thermal contraction of the substrate, and the different layers will undergo prolonged thermal hysteresis that compromises adhesion between the layers, thus giving rise to unstable product quality, a low product yield, and lack of competitiveness in terms of manufacturing cost.

SUMMARY OF THE INVENTION

In the prior art, a polyester film made by biaxial stretching, also known as biaxial orientation, cannot achieve low transmittance and high infrared-blocking rate at the same time. Moreover, adding functional particles into the raw materials at a certain percentage tends to have adverse effects on the optical properties of the resulting polyester film (e.g., increasing the haze level of the film), thus imposing limitations on the application of the film as a transparent window insulation film.

To solve the aforesaid problems of the prior art, the present invention provides a transparent polyester film having the following physical properties: a low visible light transmittance of 5-50% according to the JIS K7705 testing standard, a high infrared-blocking rate of at least 90% according to the JIS R3106 testing standard, and a haze level lower than 1.5% according to the JIS K7705 testing standard.

The transparent polyester film of the present invention has a common film thickness ranged from 12 to 75 μm, especially from 23 to 50 μm. And, the transparent polyester film may be a polyethylene terephthalate (PET) film, a polyethylene naphthalate (PEN) film, a polyvinyl chloride (PVC) film, a polycarbonate (PC) film, a polypropylene (PP) film, a polyethylene (PE) film, or a nylon film, preferably a PET film.

The ingredients of the transparent polyester film of the present invention include a thermal insulation slurry whose particle sizes range from 10 to 90 nm and/or a black pigment slurry containing carbon black particles whose particle sizes range from 20 to 80 nm. These slurries help the resulting transparent polyester film achieve transparency as well as infrared rejection. In particular, the thermal insulation slurry is composed essentially of $Cs_xN_yWO_{3-z}Cl_C$, which provides a significant improvement in infrared-blocking performance over common transparent thermal insulation materials made with antimony-doped tin oxide (ATO) or indium tin oxide (ITO).

To solve the aforesaid problems of the prior art, the present invention also provides a method for making a transparent heat-shielding polyester film having the following physical properties: a low visible light transmittance of 5-50% according to the JIS K7705 testing standard, a high infrared-blocking rate of at least 90% according to the JIS R3106 testing standard, and a haze level lower than 1.5% according to the JIS K7705 testing standard. The method for making the transparent heat-shielding polyester film of the present invention includes the steps of:

1) preparing a nanoparticle-based thermal insulation slurry with a viscosity ranging from 50 to 200 cps;
2) preparing a nanoparticle-based black pigment slurry with a viscosity ranging from 30 to 120 cps;
3) providing ethylene glycol monomers and terephthalic acid (or dimethyl terephthalate) as polymerization materials, by weight of the polymerization materials reacting the prepared nanoparticle-based thermal insulation slurry in an amount of 5-40 wt % and/or the prepared nanoparticle-based black pigment slurry in an amount of 0.005-0.1 wt % with the polymerization materials, and performing esterification and polycondensation to obtain polyester resins; and
4) extruding the polyester resins at 270-290° C. to form a transparent polyester film.

DETAILED DESCRIPTION OF THE INVENTION

The present invention provides a polyester film made by reacting at least one dicarboxylic acid and at least one diol, preferably taking terephthalic acid and ethylene glycol as materials, with one or both of a nanoparticle-based thermal insulation slurry and a nanoparticle-based black pigment slurry, subjecting the reaction to have reactants preformed an esterification and a polycondensation to obtain final produced polyester resins, and then performing extrusion and biaxial orientation on the polyester resins to form a biaxially oriented polyester film.

As the polyester film of the present invention is made with the nanoparticle-based thermal insulation slurry and/or the nanoparticle-based black pigment slurry, the film not only provides thermal insulation, but also has a uniform hue that does not fade easily. More specifically, the film has a visible light transmittance ranged between 5% and 50%, an infrared-blocking rate of at least 90%, and a haze level lower than 1.5%.

The present invention also provides a method for making a polyester film, and the method is carried out as follows:

a) Prepare a nanoparticle-based thermal insulation slurry:

The nanoparticle-based thermal insulation slurry includes the following ingredients, whose respective percentages by weight are based on the total weight of the ingredients of the thermal insulation slurry and add up to 100%:

a1) thermal insulation particles having a chemical formula of $Cs_XN_YWO_{3-Z}Cl_C$, and added at 10-50 wt %, commercially available from Nan Ya Plastics Corporation, Taiwan;

a2) ethylene glycol, added at 30-70 wt %; and a3) a dispersing aid, added at 5-40 wt %.

b) Prepare a nanoparticle-based black pigment slurry:

The nanoparticle-based black pigment slurry includes the following ingredients, whose respective percentages are based on the total weight of the ingredients of the pigment slurry and add up to 100%:

b1) carbon black particles, added at 5-25 wt %;

b2) ethylene glycol, added at 40-75 wt %; and b3) a dispersing aid, added at 10-50 wt %.

c) Prepare polyester resins:

The nanoparticle-based thermal insulation slurry prepared at step a) and/or the nanoparticle-based black pigment slurry prepared at step b) is/are added to polymerization material monomers or a mixture of polymerization material monomers. Then, esterification or ester interchange is carried out to produce polyester resins.

d) Subject the polyester resins prepared at step c) to a polyester film forming process to obtain a transparent heat-shielding polyester film.

In the method described above for making a polyester film, the step of preparing a nanoparticle-based thermal insulation slurry includes the following sub-steps:

A1) Providing thermal insulation particles formed from a powdered tungsten-containing composite metal oxychloride having a chemical formula of $Cs_XN_YWO_{3-Z}Cl_C$, wherein Cs is cesium; N is tin (Sn), antimony (Sb) or bismuth (Bi); W is tungsten; O is oxygen; and X, Y, Z, and C are positive numbers satisfying the following conditions:

$X \leq 1.0$; $Y \leq 1.0$; $Y/X \leq 1.0$; $Z \leq 0.6$, and $C \leq 0.1$;

A2) Dispersing the thermal insulation particles ($Cs_XN_YWO_{3-Z}Cl_C$) of sub-step a1) in ethylene glycol to produce a thermal insulation particle solution.

More specifically, the thermal insulation particles are added into an ethylene glycol solvent, stirred thoroughly, and set aside to moisten the particles.

To achieve uniform dispersion of the thermal insulation particles, a dispersing aid may be added into the thermal insulation particle solution in an appropriate amount, wherein the dispersing aid may be one or more selected from the group consisting of an anionic dispersant, a non-ionic dispersant and a polymeric dispersant, preferably a polymeric dispersant.

The polymeric dispersant is a copolymer with multiple anchor groups and may be one or more selected from the group consisting of a polycarboxylate, a sulfonic acid-based polyester polyol, polyphosphoric ester, polyurethane, and a modified-polyacrylate-based polymer.

The anionic dispersant may be selected from the group consisting of acrylic acid-based anionic dispersants, including a polyacrylamide (co)polymer, a sodium polyacrylate (co)polymer, a styrene-acrylic acid (co)polymer, and a sodium carboxylate copolymer.

The non-ionic dispersant may be selected from the group consisting of fatty alcohol ethoxylate and polyoxyethylene-alkylether.

A3) Using a wet-grinding machine, grind the thermal insulation particle solution prepared at sub-step a2) to further disperse the particles. Once the average particle size of the thermal insulation particles reaches 10-90 nm and the viscosity of the thermal insulation particle solution is between 50 and 200 cps, the desired nanoparticle-based thermal insulation slurry is obtained.

In the method described above for making a polyester film, the step of preparing a nanoparticle-based black pigment slurry includes the following sub-steps:

B1) Providing carbon black particles (commercially available from Orion, Cabot, Mitsubishi, and so on) as the black particles in the slurry.
B2) Dispersing the carbon black particles of sub-step b1) in ethylene glycol to produce a black-particle solution.

More specifically, the carbon black particles are added into an ethylene glycol solvent, stirred thoroughly, and set aside to moisten the particles. To achieve uniform dispersion of carbon black particles, a dispersing aid may be added into the black-particle solution in an appropriate amount, wherein the dispersing aid may be one or more selected from the group consisting of an anionic dispersant, a non-ionic dispersant, and a polymeric dispersant, preferably a polymeric dispersant.

The anionic dispersant, non-ionic dispersant, and polymeric dispersant are the same as those for use in preparing the nanoparticle-based thermal insulation slurry.

B3) Using a wet-grinding machine, grind the black-particle solution of sub-step b2) to further disperse the particles. Once the average particle size of the carbon black particles reaches 20-80 nm and the viscosity of the black-particle solution is between 30 and 120 cps, the desired nanoparticle-based black pigment slurry is obtained.

In the method described above for making a polyester film, the step of preparing polyester resins includes the following sub-steps:
C1) provide ethylene glycol monomers and terephthalic acid (or dimethyl terephthalate) as polymerization materials;
C2) by weight of the polymerization materials of sub-step c1), measure out the prepared nanoparticle-based thermal insulation slurry in an amount of 5-40 wt % and/or the prepared nanoparticle-based black pigment slurry in an amount of 0.005-0.1 wt %; wherein the nanoparticle-based thermal insulation slurry is preferably used at 5-30 wt %, more preferably 25-30 wt %, by weight of the polymerization materials;
C3) Add the nanoparticle-based thermal insulation slurry and/or nanoparticle-based black pigment slurry prepared at sub-step c2) sequentially into the ethylene glycol monomers while stirring the ethylene glycol monomers, and then, add in the terephthalic acid or dimethyl terephthalate. After that, perform esterification at 250-285° C. for 100-140 min. Once esterification is completed, lower the pressure for 30-45 min; and
C4) Next, perform polycondensation in the presence of an antimony or titanium catalyst while the temperature is lowered from 280° C. to about 260° C. The polycondensation reaction takes 160-240 min, producing a molten mass of polyester and a byproduct. Remove the byproduct by refinery distillation, and cool the molten mass of polyester. Then, cut the cooled molten mass of polyester into the desired polyester resins.

In the method described above for making a polyester film, the process for producing a transparent heat-shielding polyester film whose physical properties including both a lower visible light transmittance and a higher infrared-blocking rate comprises the following sub-steps:
D1) Use the prepared polyester resins as raw materials;
D2) Extrude the polyester resins formed as an extrudate product at 270-290° C., and biaxially stretch the extrudate to form a polyester film; and
D3) Once the film is set, a transparent polyester film with a lower visible light transmittance and a higher infrared-blocking rate is obtained.

The polyester film of the present invention is advantageous in that it can block infrared radiation effectively, has a low haze level, and is weather-resistant as well as aging-resistant, featuring a low visible light transmittance of 5-50% according to the JIS K7705 testing standard, a high infrared-blocking rate of at least 90% according to the JIS R3106 testing standard, and a haze level lower than 1.5% according to the JIS K7705 testing standard.

The polyester film of the present invention is therefore perfect for use on the glazing of buildings, on the glass panels of vehicles, and in agricultural applications to protect crops from overexposure to the sun, providing outstanding thermal insulation while also overcoming the drawbacks of the conventional thermal insulation films made by sputtering or wet coating, namely a complicated manufacturing process, high cost, and unsatisfactory quality.

The physical properties of the polyester film of the present invention were evaluated by the following measuring/testing methods:

1. Particle Size Measurement:
Dynamic Light-Scattering Particle Size Distribution Analyzer LB-500 of HORIBA, Japan, was used to measure the sizes of the ground and dispersed particles in the nanoparticle-based thermal insulation slurry and nanoparticle-based black pigment slurry.

2. Visible Light Transmittance (VLT %) Test:
The transmittance and haze of a transparent heat-shielding polyester film are tested with the TC-H III Haze Meter produced by Tokyo Denshoku Co., Ltd. of Japan, and the test is conducted according to the JIS K7705 testing standard.

The higher the visible light transmittance, the more transparent the transparent heat-shielding film.

3. Infrared-Blocking Rate (IR Cut %) Test:
The infrared-blocking rate of a polyester film is tested with the LT-3000 infrared cut rate tester produced by HOYA of Japan, and the test is conducted according to the JIS R3106 testing standard.

The higher the infrared-blocking rate, the more effective the polyester film is in thermal insulation.

4. Haze (Hz %) Test:
The transmittance and haze of a transparent heat-shielding polyester film are tested with the TC-H III Haze Meter produced by Tokyo Denshoku Co., Ltd. of Japan, and the test is conducted according to the JIS K7705 testing standard.

The smaller the haze (Hz %) value, the more clarity the transparent heat-shielding polyester film.

5. Quick Ultra-Violet (QUV) Weathering Test:
The ATLAS UV TEST weatherometer of Atlas Technology Co. was used for the test, and the parameters of the test are as follows: wavelength of the UVB light tubes: 313 nm; testing temperature: 50-60° C.; irradiation cycle: 4 hours of irradiation followed by 4 hour of steaming, per cycle; test duration: 1000 hours; and irradiation power: 71 w/m$^2$. The colorimetric value DE was detected with a spectroscope. The lower the DE value, the higher the weather-resistance.

The physical properties of the polyester film of the present invention are demonstrated by and compared between the following examples 1-8 and comparative examples 1-12. Please note that the scope of the present invention is not limited by the examples or comparative examples.

Example 1

A 38 μm-thick polyester film was made in the following manner. Ethylene glycol monomers and terephthalic acid (or dimethyl terephthalate) were used as the polymerization materials. A nanoparticle-based thermal insulation slurry is prepared to contain thermal insulation particles ($Cs_XN_YWO_{3-Z}Cl_C$) each having a particle size of 10 nm, and a black pigment slurry is prepared to contain carbon black particles each having a particle size of 20 nm.

Based on the total weight of the polymerization materials, the prepared nanoparticle-based thermal insulation slurry and the black pigment slurry were added at 30 wt % and 0.005 wt % respectively.

Esterification and polycondensation were subsequently performed to produce polyester resins, which were extruded and stretched at 270-290° C. via a conventional polyester film forming process until a 38 μm-thick transparent polyester film was formed.

The physical properties of the resulting polyester film are shown in Table 1.

Example 2

A 38 μm-thick polyester film was made in the same way as in example 1, except that the particle size of the thermal insulation particles ($Cs_XN_YWO_{3-Z}Cl_C$) was changed to 65 nm, and that the black pigment slurry was added at 0.01 wt %.

The physical properties of the resulting polyester film are shown in Table 1.

Example 3

A 38 μm-thick polyester film was made in the same way as in example 1, except that the particle size of the thermal insulation particles ($Cs_XN_YWO_{3-Z}Cl_C$) was changed to 90 nm, and that the black pigment slurry was added at 0.05 wt %.

The physical properties of the resulting polyester film are shown in Table 1.

Example 4

A 38 μm-thick polyester film was made in the same way as in example 1, except that the thermal insulation slurry was added at 25 wt %, that the particle size of the thermal insulation particles ($Cs_XN_YWO_{3-Z}Cl_C$) was changed to 10 nm, that the black pigment slurry was added at 0.05 wt %, and that the particle size of the carbon black particles was changed to 50 nm.

The physical properties of the resulting polyester film are shown in Table 1.

Example 5

A 38 μm-thick polyester film was made in the same way as in example 1, except that the thermal insulation slurry was added at 25 wt %, that the particle size of the thermal insulation particles ($Cs_XN_YWO_{3-Z}Cl_C$) was changed to 65 nm, that the black pigment slurry was added at 0.07 wt %, and that the particle size of the carbon black particles was changed to 50 nm.

The physical properties of the resulting polyester film are shown in Table 1.

Example 6

A 38 μm-thick polyester film was made in the same way as in example 1, except that the thermal insulation slurry was added at 25 wt %, that the particle size of the thermal insulation particles ($Cs_XN_YWO_{3-Z}Cl_C$) was changed to 90 nm, that the black pigment slurry was added at 0.07 wt %, and that the particle size of the carbon black particles was changed to 80 nm.

The physical properties of the resulting polyester film are shown in Table 1.

Example 7

A 23 μm-thick polyester film was made in the same way as in example 2, wherein the particle size of the thermal insulation particles ($Cs_XN_YWO_{3-Z}Cl_C$) was 65 nm, the black pigment slurry was added at 0.01 wt %, and the particle size of the carbon black particles was 50 nm.

The physical properties of the resulting polyester film are shown in Table 1.

Example 8

A 50 μm-thick polyester film was made in the same way as in example 2, wherein the particle size of the thermal insulation particles ($Cs_XN_YWO_{3-Z}Cl_C$) was 65 nm, the black pigment slurry was added at 0.01 wt %, and the particle size of the carbon black particles was 50 nm.

The physical properties of the resulting polyester film are shown in Table 1.

Comparative Example 1

A 38 μm-thick polyester film was made, without adding any thermal insulation slurry or black pigment slurry for polyesterification.

The physical properties of the resulting polyester film are shown in Table 1.

Comparative Example 2

A 38 μm-thick polyester film was made in the same way as in example 1, except that the black pigment slurry was added at 0.15 wt %.

The physical properties of the resulting polyester film are shown in Table 1.

Comparative Example 3

A 38 μm-thick polyester film was made in the same way and with the same amount of thermal insulation slurry added for polyesterification as in example 1, except that the particle size of the thermal insulation particles ($Cs_XN_YWO_{3-Z}Cl_C$) was changed to 120 nm, that the weight percentage of the black pigment slurry was changed to 0.05 wt %, and that the particle size of the carbon black particles was changed to 100 nm. The physical properties of the resulting polyester film are shown in Table 1.

Comparative Example 4

A 38 μm-thick polyester film was made, without adding any black pigment slurry for polyesterification. In the course of proceeding polyesterification, the thermal insulation slurry was added at 5 wt % and the particle size of the thermal insulation particles ($Cs_XN_YWO_{3-Z}Cl_C$) was 65 nm.

The physical properties of the resulting polyester film are shown in Table 1.

Comparative Example 5

A 38 μm-thick polyester film was made in the same way as in Comparative Example 4 without using any black pigment slurry, except that the amount of the thermal insulation slurry added for polyesterification was changed to 10 wt %.

The physical properties of the resulting polyester film are shown in Table 1.

Comparative Example 6

A 38 μm-thick polyester film was made in the same way as in Comparative Example 4 without using any black pigment slurry, except that the amount of the thermal insulation slurry added for polyesterification was changed to 15 wt %.

The physical properties of the resulting polyester film are shown in Table 1.

Comparative Example 7

A 38 μm-thick polyester film was made in the same way as in Comparative Example 4 without using any black pigment slurry, except that the amount of the thermal insulation slurry added for polyesterification was changed to 20 wt %.

The physical properties of the resulting polyester film are shown in Table 1.

Comparative Example 8

A 38 μm-thick polyester film was made without using any thermal insulation slurry for polyesterification. In the course of proceeding polyesterification, the black pigment slurry was added at 0.005 wt %, with the particle size of the carbon black particles being 50 nm.

The physical properties of the resulting polyester film are shown in Table 1.

Comparative Example 9

A 38 μm-thick polyester film was made in the same way as in Comparative Example 8 without using any thermal insulation slurry, except that the amount of the black pigment slurry added for polyesterification was changed to 0.01 wt %.

The physical properties of the resulting polyester film are shown in Table 1.

Comparative Example 10

A 38 μm-thick polyester film was made in the same way as in Comparative Example 8 without using any thermal insulation slurry, except that the amount of the black pigment slurry added for polyesterification was changed to 0.05 wt %.

The physical properties of the resulting polyester film are shown in Table 1.

Comparative Example 11

A 38 μm-thick polyester film was made in the same way as in Comparative Example 8 without using any thermal insulation slurry, except that the amount of the black pigment slurry added for polyesterification was changed to 0.1 wt %.

The physical properties of the resulting polyester film are shown in Table 1.

Comparative Example 12

A 38 μm-thick polyester film was made in the same way as in example 1, except that polymerization was carried out without any thermal insulation slurry or black pigment slurry, and that the thermal insulation slurry and the black pigment slurry were mixed with the polyester resins in the film forming (i.e., extrusion and stretching) stage, before the mixture was heated and stretched into a 38 μm-thick polyester film, wherein the thermal insulation slurry was added at 30 wt % and had a particle size of 65 nm and the black pigment slurry was added at 0.01 wt % and had a particle size of 50 nm. The physical properties of the resulting polyester film are shown in Table 1.

TABLE 1

Physical Property Analysis of polyester films

| | | thermal insulation slurry (wt %) Particle size (nm) | | | | black pigment slurry (wt %) Particle size (nm) | | | | VLT (%) | IR cut (%) | Haze (Hz %) | QUV 500 Hrs (DE) |
|---|---|---|---|---|---|---|---|---|---|---|---|---|---|
| | | 10 | 65 | 90 | 120 | 20 | 50 | 80 | 100 | | | | |
| Example | 1 | 30 | — | — | — | 0.005 | — | — | — | 50 | 90 | 1.06 | 2.7 |
| | 2 | — | 30 | — | — | — | 0.01 | — | — | 35 | 93 | 1.12 | 2.5 |
| | 3 | — | — | 30 | — | — | — | 0.05 | — | 23 | 95 | 1.38 | 2.0 |
| | 4 | 25 | — | — | — | — | 0.05 | — | — | 23 | 91 | 1.22 | 2.4 |
| | 5 | — | 25 | — | — | — | 0.07 | — | — | 9 | 94 | 1.30 | 2.1 |
| | 6 | — | — | 25 | — | — | — | 0.07 | — | 5 | 97 | 1.42 | 2.0 |
| | 7 | — | 30 | — | — | — | 0.01 | — | — | 38 | 92 | 1.12 | 2.6 |
| | 8 | — | 30 | — | — | — | 0.01 | — | — | 30 | 94 | 1.12 | 2.4 |
| Comparative Example | 1 | — | — | — | — | — | — | — | — | 92 | 12 | 0.14 | 4.5 |
| | 2 | 30 | — | — | — | 0.15 | — | — | — | 2 | 99 | 1.49 | 1.3 |
| | 3 | — | — | — | 30 | — | — | — | 0.05 | 20 | 98 | 12.1 | 1.6 |
| | 4 | — | 5 | — | — | — | — | — | — | 79 | 12 | 0.71 | 5.3 |
| | 5 | — | 10 | — | — | — | — | — | — | 76 | 16 | 0.75 | 5.1 |
| | 6 | — | 15 | — | — | — | — | — | — | 73 | 19 | 0.82 | 4.8 |
| | 7 | — | 20 | — | — | — | — | — | — | 71 | 22 | 0.88 | 4.5 |
| | 8 | — | — | — | — | — | 0.005 | — | — | 52 | 15 | 0.87 | 2.9 |
| | 9 | — | — | — | — | — | 0.01 | — | — | 37 | 18 | 0.92 | 2.6 |

TABLE 1-continued

Physical Property Analysis of polyester films

| | thermal insulation slurry (wt %) Particle size (nm) | | | | black pigment slurry (wt %) Particle size (nm) | | | | VLT (%) | IR cut (%) | Haze (Hz %) | QUV 500 Hrs (DE) |
|---|---|---|---|---|---|---|---|---|---|---|---|---|
| | 10 | 65 | 90 | 120 | 20 | 50 | 80 | 100 | | | | |
| 10 | — | — | — | — | — | 0.05 | — | — | 26 | 22 | 1.03 | 2.4 |
| 11 | — | — | — | — | — | 0.1 | — | — | 6 | 47 | 1.14 | 2.0 |
| 12 | — | — | 30* | — | — | 0.01* | — | — | 28-36 | 89-94 | 1.12-3.21 | 2.3-3.9 | note:
in comparative example 12 the thermal insulation slurry and the black pigment slurry were mixed with polyester resins in the film forming stage, i.e., added in extrusion and stretching stage.

Results:
1. According to Table 1, the polyester films in those comparative examples 4-7 without carbon black particles had high visible light transmittance values and therefore did not feature low visible light transmittance.
2. According to Table 1, the polyester films in those comparative examples 8-11 without thermal insulation particles had low infrared-blocking rates and were therefore ineffective in blocking infrared radiation.
3. According to Table 1, the polyester films in the examples 1-8 had low visible light transmittance and high infrared-blocking rates thanks to the inclusion of both the thermal insulation particles and the carbon black particles.
4. According to Table 1, the polyester film in the comparative example 1, neither having thermal insulation particles nor carbon black particles, had much higher visible light transmittance and a far lower infrared-blocking rate than that of the polyester film in the example 2.
5. According to Table 1, the polyester film was made in the comparative example 2 where both the nanoparticle-based thermal insulation slurry and the nanoparticle-based carbon black slurry were added at exceedingly large percentages, resulted in that the polyester film of the comparative example 2 had a high infrared-blocking rate but so low visible light transmittance that the film was almost impermeable to light.
6. According to Table 1, the polyester film was made in the comparative example 3 where both the nanoparticle-based thermal insulation slurry and the nanoparticle-based carbon black slurry were added and contained relatively large particles, resulted in that the polyester film of the comparative example 3 had low visible light transmittance, a high infrared-blocking rate, and a relatively high haze level that compromised the clarity of the polyester film.
7. According to Table 1, the polyester film was made in the comparative example 12 where the thermal insulation slurry and the black pigment slurry were mixed with the polyester resins in the film forming stage, i.e., added in extrusion and stretching stage, showed relatively low uniformity in concentration such that the visible light transmittance, infrared-blocking rate, haze level, and QUV weather-resistance of the film were less uniform than that of the polyester film in the example 2, which is an indication of unstable quality.

What is claimed is:
1. A method for making a transparent polyester film with low visible light transmittance and a high infrared-blocking rate as well as a common film thickness ranged from 12 to 75 μm, comprising the steps of:

a) preparing a nanoparticle-based thermal insulation slurry with a viscosity of 50-200 cps, wherein the thermal insulation slurry comprises the following ingredients a1)-a3) to add up to 100%:
  a1) 10-50 wt % of thermal insulation particles, based on the total weight of the thermal insulation slurry; and the thermal insulation particles having a chemical formula of $Cs_XN_YWO_{3-Z}Cl_C$ with an average particle size of 10-90 nm,
    wherein Cs is cesium; N is tin (Sn), antimony (Sb), or bismuth (Bi); W is tungsten; O is oxygen; and X, Y, Z, and C are positive numbers satisfying the following conditions:

$X \leq 1.0$; $Y \leq 1.0$; $Y/X \leq 1.0$; $Z \leq 0.6$, and $C \leq 0.1$;

a2) 30-70 wt % of ethylene glycol, based on the total weight of the thermal insulation slurry; and
  a3) 5-40 wt % of a dispersing aid, based on the total weight of the thermal insulation slurry; wherein the dispersing aid is one or more selected from the group consisting of an anionic dispersant, a non-ionic dispersant and a polymeric dispersant;
b) preparing a nanoparticle-based black pigment slurry with a viscosity of 30-120 cps, wherein the pigment slurry comprises the following ingredients b1)-b3) to add up to 100%:
  b1) 5-25 wt % of carbon black particles with an average particle size of 20-80 nm, based on the total weight of the pigment slurry;
  b2) 40-75 wt % of ethylene glycol, based on the total weight of the pigment slurry; and
  b3) 10-50 wt % of a dispersing aid, based on the total weight of the pigment slurry; wherein the dispersing aid is one or more selected from the group consisting of an anionic dispersant, a non-ionic dispersant and a polymeric dispersant;
c) making polyester resins by steps of:
  c1) providing ethylene glycol monomers and terephthalic acid or dimethyl terephthalate as polymerization materials, and reacting 5-40 wt % of the prepared nanoparticle-based thermal insulation slurry of step a) and/or 0.005-0.1 wt % of the prepared nanoparticle-based black pigment slurry of step b) with the polymerization materials, by weight of the polymerization materials respectively;
  c2) performing esterification at 250-285° C. for 100-140 min, and effecting pressure reduction for 30-45 min after the esterification is completed; and
  c3) performing polycondensation at about 260° C. for 160-240 min in the presence of an antimony or titanium catalyst to produce a molten mass of polyester and a byproduct, removing the byproduct by refinery distillation, cooling the molten mass of polyester, and cutting the cooled molten mass of polyester into polyester resins; and d) extruding the polyester resins at 270-290° C. to form a transparent polyester film whose physical properties feature a low visible light transmittance of 5-50% according to the JIS K7705 testing standard, a high infrared-blocking rate of at least 90% according to the JIS R3106 testing standard, and a haze level lower than 1.5% according to the JIS K7705 testing standard.

2. The method for making a transparent polyester film as defined in claim 1, wherein at step c1) the prepared nano-particle-based thermal insulation slurry is used in an amount of 5-30 wt %, by weight of the polymerization materials, to react with the polymerization materials.

3. The method for making a transparent polyester film as defined in claim 1, wherein at step c1) the prepared nano-particle-based thermal insulation slurry is used in an amount of 25-30 wt %, by weight of the polymerization materials, to react with the polymerization materials.

4. The method for making a transparent polyester film as defined in claim 1, wherein at step a3) or b3) the polymeric dispersant is one or more selected from the group consisting of a polycarboxylate, a sulfonic acid-based polyester polyol, polyphosphoric ester, polyurethane and a modified-polyacrylate-based polymer.

5. The method for making a transparent polyester film as defined in claim 1, wherein at step a3) or b3) the anionic dispersant is one or more selected from the group consisting of a polyacrylamide (co)polymer, a sodium polyacrylate (co)polymer, a styrene-acrylic acid (co)polymer and a sodium carboxylate copolymer.

6. The method for making a transparent polyester film as defined in claim 1, wherein at step a3) or b3) the non-ionic dispersant is selected from the group consisting of fatty alcohol ethoxylate and polyoxyethylenealkylether.

* * * * *